United States Patent [19]
Williamson et al.

[11] 3,981,418
[45] Sept. 21, 1976

[54] EXPULSION DEVICE

[75] Inventors: Clyde E. Williamson, Los Angeles; Louis A. Rosales, Manhattan Beach, both of Calif.

[73] Assignee: TRW Inc., Redondo Beach, Calif.

[22] Filed: Nov. 18, 1966

[21] Appl. No.: 596,052

[52] U.S. Cl. ............................................ 222/386.5
[51] Int. Cl.$^2$.......................................... F23K 5/00
[58] Field of Search ................ 89/1; 222/386.5, 95; 239/323; 158/50.1

[56] References Cited
UNITED STATES PATENTS

| | | | |
|---|---|---|---|
| 2,970,452 | 2/1961 | Beckman et al. | 222/386.5 X |
| 3,070,265 | 12/1962 | Everett | 222/386.5 |
| 3,145,884 | 8/1964 | Everett | 222/386.5 |
| 3,471,349 | 10/1969 | Cohen et al. | 222/386.5 X |

*Primary Examiner*—Verlin R. Pendegrass
*Attorney, Agent, or Firm*—Daniel T. Anderson; Donald R. Nyhagen; William B. Leach

[57] ABSTRACT

An improved fluid expulsion device of the class comprising an expulsion container containing a diaphragm adapted to be displaced by a pressure fluid acting on one side of the diaphragm to expel a second fluid at the opposite side of the diaphragm. The diaphragm is bonded to the inner container wall, either by electro-deposition of a metal on the wall in such a way as to form the diaphragm on and in bonded relation to the wall or by adhesively bonding a preformed diaphragm to the wall by adhesive bands, whereby displacement of the diaphragm is accompanied by peeling of the latter from the container wall without wrinkling, tearing, or ripping.

3 Claims, 6 Drawing Figures

Louis A. Rosales,
Clyde E. Williamson,
INVENTORS.

BY.

Donald W. Graves,

ATTORNEY.

Louis A. Rosales,
Clyde E. Williamson,
INVENTORS.

BY.

Donald W. Graves

ATTORNEY.

EXPULSION DEVICE

BACKGROUND OF THE INVENTION

1. Field of the Invention

This invention relates generally to fluid expulsion devices and more particularly to improvements in bonded diaphragm type fluid expulsion devices.

2. Prior Art

In the area of expulsion devices for fluids, particularly in zero gravity environments such as experienced in space, there are many problems associated with obtaining maximum expulsion efficiency. For example, there is a problem in maintaining a separation between the pressurant gas and the expelled liquid which may be propellant. Another problem arises in attempting to expel all of the stored fluid so as to obtain maximum efficiency. The efficiency of an expulsion device is usually measured as a percentage. This percentage is calculated by obtaining the ratio of the amount of fluid expelled to the total amound of fluid stored prior to expulsion.

One of the more common methods of solving the aforementioned problems comprises providing a diaphragm between the fluid to be expelled and the pressurization medium, typically a gas. This diaphragm or bladder is interposed between the inlet for the pressurized gas (or the tank in which the pressurant gas is stored) and the outlet for the fluid to be expelled. An example of this type of application as used in a space craft is disclosed in the U.S. Pat. to Studhalter et al., U.S. Pat. No. 2,979,897 with still another expulsion device disclosed in the U.S. Pat. to Black, U.S. Pat. No. 3,197,087. The combination of a piston and bladder is disclosed in the patent to Behman et al., U.S. Pat. No. 2,970,452. Other examples are disclosed in two U.S. patents to Everett, U.S. Pat. Nos. 3,070,265 and 3,140,802.

With the typical bladder construction, however, problems arise. For example, uneven folding can wrinkle the bladder which renders the bladder more susceptible to ripping or tearing especially if the diaphragm is of the metallic construction as required for use with many highly corrosive fluids. Also, if the bladder unfolds nonuniformly, there can be a shift of the center of gravity of the fluid to be expelled which in a missile is undesirable since this will affect the direction of thrust.

In the area of ordnance, it is desirable to have weapons that give off a minimum of sound. An example is a mortar round or grenade launcher. An example of such ordnance is disclosed in the U.S. Pat. to Gregory 1,166,360. In this patent, a bladder or diaphragm is used to separate a charge and the projectile. However, the bladder is subject to uneven unfolding and side pressures on the projectile which results in binding of the projectile in the case or loss of velocity.

Heretofore, a variety of solutions to the above problems have been proposed. One of these solutions involves bonding of the expulsion diaphragm to the wall of the expulsion container, whereby displacement of the diaphragm by the pressurizing fluid is accompanied by peeling of the diaphragm away from the container wall in a manner which achieves uniform displacement of the diaphragm without wrinkling, tearing, or other damage. Various methods of bonding the diaphragm to the container wall have also been proposed. According to one of the bonding methods of which we are aware, for example, the diaphragm is preformed and then adhesively bonded to the container wall over substantially the entire diaphragm surface in contact with the wall. The Cohen U.S. Pat. No. 3,471,349 describes another bonding method involving spray coating the wall of an expulsion container with a plastic material (polytetrafluoroethylene) to form the diaphragm on and in bonded relation to the wall. The sprayed plastic coat or layer is then baked to form the finished diaphragm.

SUMMARY OF THE INVENTION

This invention provides improvements in bonded diaphragm type fluid expulsion devices. According to one aspect of the invention, a fluid expulsion device is provided having a diaphragm which is formed directly on and in bonded relation to the wall of an expulsion container by electrodepositing the diaphragm on the container wall. This electrodeposition method has the advantage of producing a molecular bond between the diaphragm and wall and producing the finished diaphragm in the single electrodeposition step.

BRIEF DESCRIPTION OF THE DRAWINGS

Referring to FIG. 1, there is shown an expulsion container 2 which contains a cavity 4, which for purposes of illustration, would contain a liquid propellant. Having an edge 6 clamped between halves 3 and 5 is a bladder or diaphragm 8 which covers the upper half 3 of the interior of container 2. An inlet 10 is provided through which pressurant gas can be introduced into the container above the diaphragm. A propellant outlet 12 receives propellant from cavity 4 below the diaphragm. Valves are normally provided but are omitted here for purposes of clarity.

Figure 1:
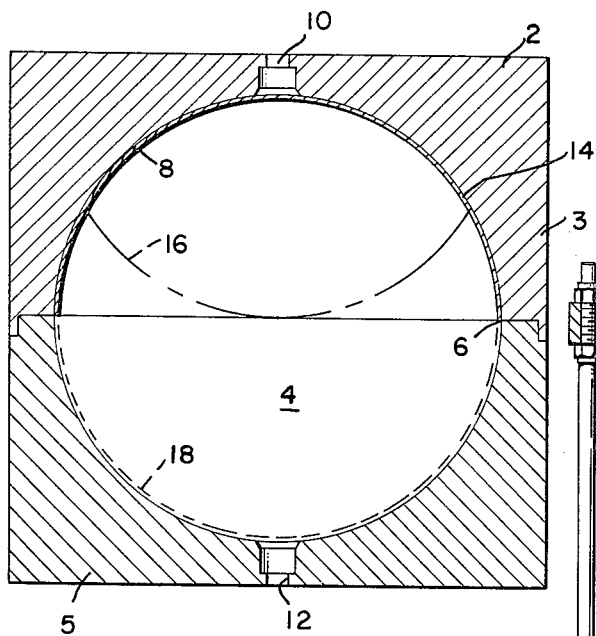
FIG. 1 is a view partially in cross-section of an expulsion device constructed in accordance with one embodiment of this invention.

According to the present invention, the diaphragm 8 is electrodeposited directly on the upper half 3 of the expulsion container 2. Being electrodeposited directly on the container wall in this way, the diaphragm is bonded over substantially its entire outer surface area to the container by a direct metal-to-metal molecular bond and conforms exactly to the interior surface of container 2, thus obtaining maximum volumetric efficiency since there are no pockets. This has the advantage of not only allowing maximum storage of fluid but in addition precludes pressurant gas from entering transient spaces between the diaphragm and the container. This provides uniformity of peeling and minimization of wrinkling. Moreover, the finished diaphragm is produced in the single electrodeposition step.

In operation, gas under pressure is introduced through inlet 10. This causes diaphragm 8 to peel away from interior wall 14 and undergo downward displacement. An intermediate position of the diaphragm is shown in dotted lines at 16. Fluid, such as liquid propellant on the other side of the diaphragm is expelled through outlet 12. In the fully expelled position, the diaphragm would be in the position shown by dotted line 18 with propellant 100% expelled. The material making up the bladder wall can be chosen according to the particular application, but for purposes of illustration is either nickel, copper or aluminum although it is within the scope of this invention to choose other materials, these being given only by way of examples. To further insure uniformity of peeling, the diaphragm is preferably varied in thickness or tapered such that its thickness increases from the point adjacent inlet 10 toward its edge 6. For example, the thickness of the diaphragm adjacent point 10 would be 0.006 – 0.008 inches, gradually increasing in thickness to 0.016 – 0.018 inches at edge 6. This presents the advantages of controlling the peeling in that the force necessary to peel the diaphragm increases as the propellant is expelled.

Thus, any tendency for one portion of the wall to peel faster than another portion is soon negated due to the increased resistance encountered, allowing the remaining wall portion to catch up.

Figure 2:
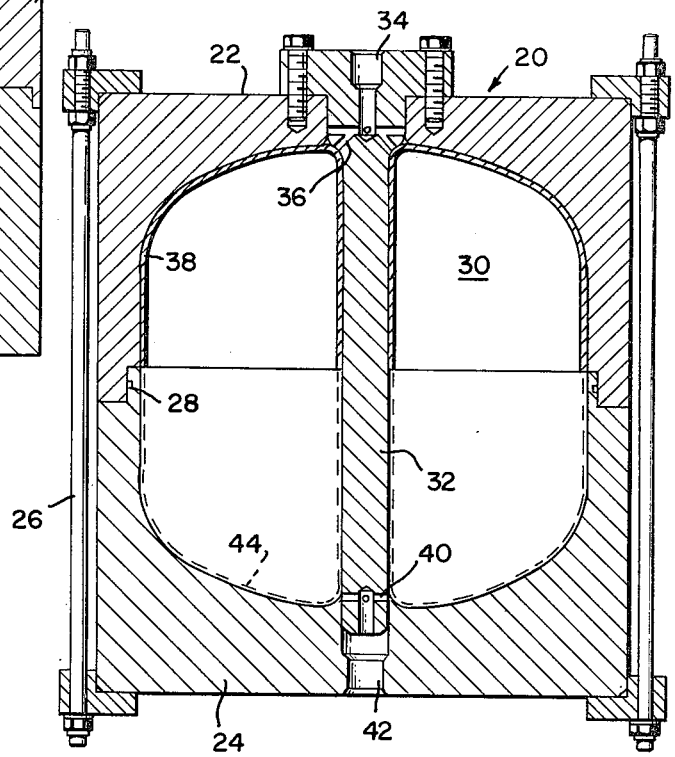
FIG. 2 is a view partially in cross-section of another embodiment of this invention.

Referring to FIG. 2, another embodiment of this invention is shown. An expulsion container indicated generally at 20 includes an upper part 22 which is attached to lower part 24 by means of longitudinal rods 26. A seal 28 is provided. Located centrally of cavity 30 is a central support member 32 which may be hollow, if desired, to allow either the introduction of pressurant gas or the expulsion of fluid. A pressurant inlet 34 is provided which allows gas through ports 36 to pressurize diaphragm 38 in a manner similar to that described with reference to FIG. 1. Diaphragm 38 not only covers the upper half of container 20 but in addition extends down the upper part of support 32. Fuel or other fluid in cavity 30 is expelled through ports 40 and outlet 42. The diaphragm in its fully expelled position is illustrated by dotted line 44. As in the example of FIG. 1, the diaphragm may have a varied adhesion or may be tapered in thickness.

Figure 3:
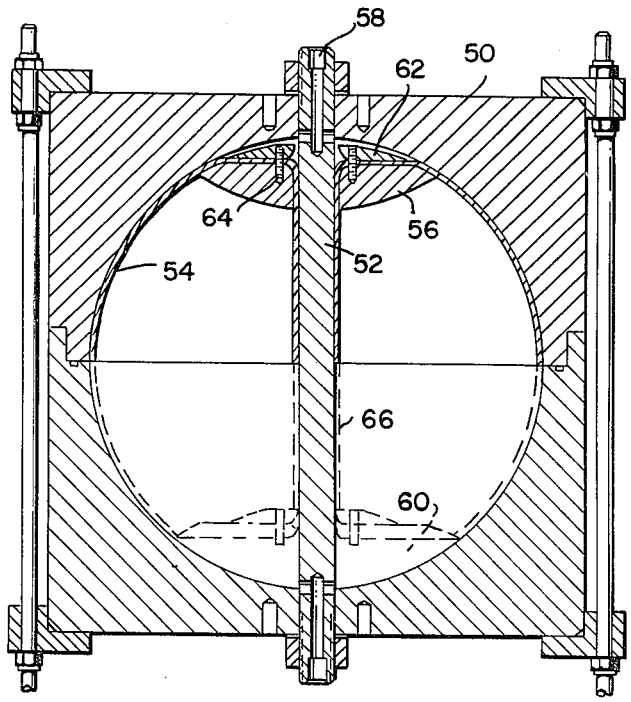
FIG. 3 is a view partially in cross-section illustrating still another embodiment of this invention.

In FIG. 3, still another embodiment of this invention is shown and in most respects is similar to that of FIG. 2 with the exception that a piston is employed. Thus, expulsion container 50 has a support member 52 placed therein. A diaphragm or bladder 54, which in this case is preformed, covers the upper half of the interior of container 50. This diaphragm extends over piston 56 and along the exterior of support member 52. Introduction of pressurant gas through port 58 will force piston 56 to move downwardly carrying diaphragm 54 therewith ultimately ending in the dotted line position indicated generally by arrow 60. Diaphragm 54 is clamped by means of clamping bar 62 and bolts 64 to piston 56. The diaphragm in its fully expelled position is shown at 66. By this arrangement, even greater control of the diaphragm peeling is obtained since the piston is maintained symmetrical relative to the central support member. The diaphragm may also vary in bonding resistance.

Figure 4:
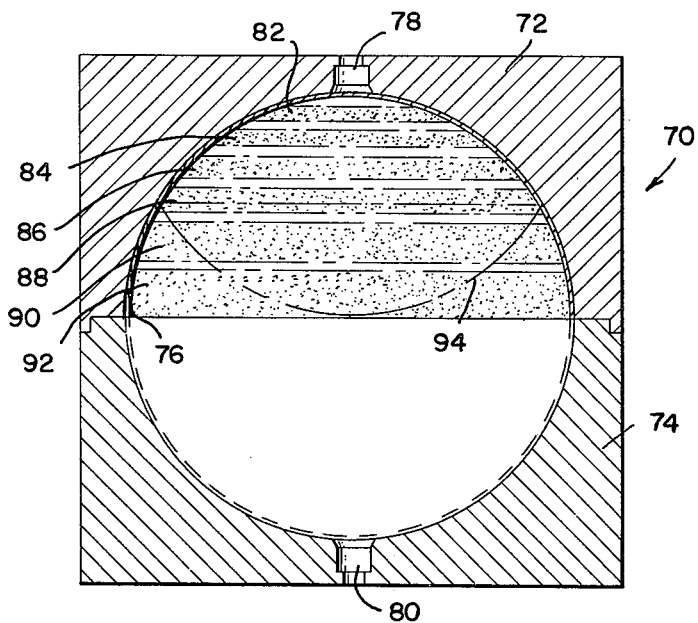
FIG. 4 is a view partially in cross-section of still another embodiment of this invention.

In FIG. 4, one means of obtaining uniformity of diaphragm peeling is illustrated. As in the embodiment of FIG. 1 an expulsion container 70 consisting of section 72 and 74 is shown. A bladder or diaphragm 76 covers the upper half 72 of container 70. The pressurant inlet is shown at 78 with the fluid outlet at 80. Bands 82, 84, 86, 88, 90 and 92 are shown which as can be seen individually increase in width from the inlet toward the outlet.

These bands are adhesive bands which bond the diaphragm 76 to the container section 72. It can be appreciated, therefore, that the peeling resistance of the diaphragm increases as the fluid is expelled through outlet 80. In dotted lines 94 there is illustrated the diaphragm in partially expelled position.

Figure 5:
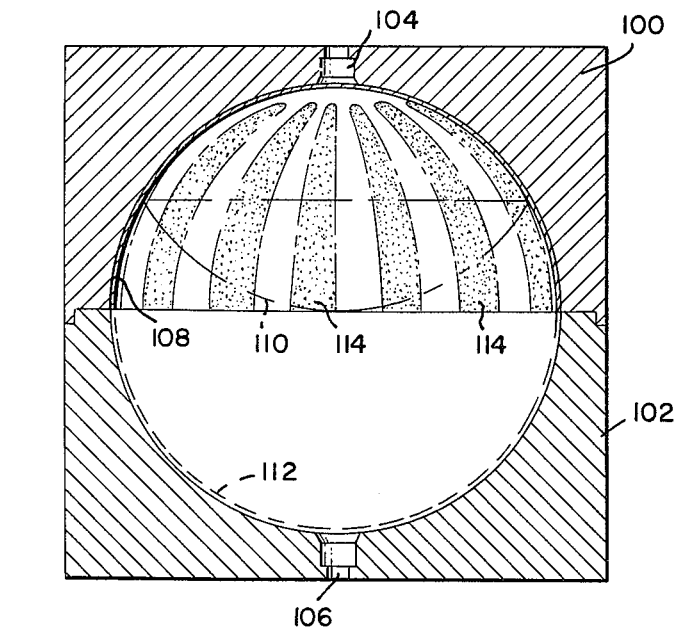
FIG. 5 is a view partially in cross-section of still another embodiment of this invention.

Another means of obtaining uniformity of expulsion is seen in FIG. 5 wherein an expulsion container is formed by upper half portion 100 and lower half portion 102. A gas inlet 104 and a fluid outlet 106 is provided as in the other embodiment. A diaphragm 108 covers the upper half of the container. Dotted line 110 represents a partially expelled position of the diaphragm with dotted line 112 representing the fully expelled condition.

Tapered bands 114, as in an orange peel configuration, are bands of adhesive which bond the diaphragm to the upper container portion 100 and extend in a direction generally from the inlet to the outlet. As can be seen in FIG. 5, these adhesive bands vary in width so as to provide increased peeling resistance as the fluid is expelled.

Figure 6:
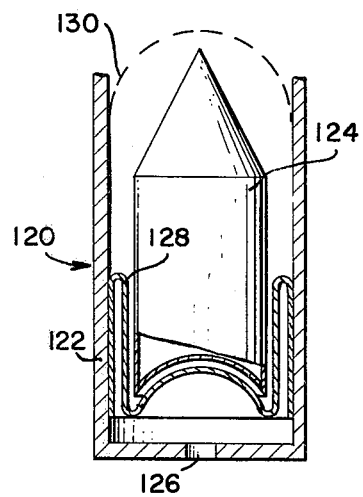
FIG. 6 is a view partially in cross-section of this invention as applied to a projectile launching mechanism.

In FIG. 6 a device constructed according to this invention is shown as applied to an ordnance device such as a mortar. A mortar is shown generally at 120 and includes a mortar casing 122 having a mortar shell or round 124 contained therein. An opening 126 is provided through which gas under pressure can be introduced. A bladder or diaphragm 128 is bonded to the interior of casing 122 in a manner similar to that previously disclosed. When gas is introduced through port 126 against the bladder, it will peel forcing mortar shell or round 124 upwardly with the bladder's ultimate position shown by dotted line 130. This has the advantage of smoothly unfolding the bladder, thus precluding loss of gas due to ripping caused by non-uniform peeling. In addition, sound caused by expanding gas is attenuated by the bladder thus giving little indication to the enemy of the whereabouts of the mortar.

Thus, it can be seen that by this invention a new and improved expulsion device is obtained which possesses many advantages over those found in the prior art. While specific examples have been given, it is to be understood that the scope of the invention is to be measured only by the claims appended hereto.

What is claimed is:

1. A fluid expulsion device comprising:
    a container;
    inlet means for introduction of a first fluid into said container;
    an outlet for expulsion of a second fluid from said container; and
    a diaphragm within and electrodeposited on the interior wall of said container for separating said first and second fluids, said diaphragm being bonded over substantially its entire surface to the interior wall of said container, whereby said diaphragm will peel smoothly from said container when said second fluid is expelled through said outlet in response to said first fluid being introduced into said container.

2. A fluid expulsion device comprising:
    a container;
    inlet means for introduction of a first fluid into said container;

an outlet for expulsion of a second fluid from said container;

a diaphragm within said container for separating said first and second fluids, said diaphragm being bonded to the interior wall of said container by an adhesive bond which increases in strength in a direction from said inlet toward said outlet and comprises a plurality of adhesive bands, said bands located toward said outlet being wider than the bands located away from said outlet; and whereby said diaphragm will peel smoothly from said container when said second fluid is expelled through said outlet in response to said first fluid being introduced into said container.

3. A fluid expulsion device comprising:

a container;

inlet means for introduction of a first fluid into said container;

an outlet for expulsion of a second fluid from said container;

a diaphragm within said container for separating said first and second fluids, said diaphragm being bonded to the interior wall of said container by an adhesive bond which increases in strength in a direction from said inlet toward said outlet and comprises a plurality of adhesive bands, said bands extending in a direction toward said outlet in an orange peel arrangement with the thickness of the peels increasing in a direction toward said outlet; and whereby said diaphragm will peel smoothly from said container when said second fluid is expelled through said outlet in response to said first fluid being introduced into said container.

* * * * *